(12) United States Patent
Inamura et al.

(10) Patent No.: US 7,772,870 B2
(45) Date of Patent: Aug. 10, 2010

(54) METHOD AND APPARATUS FOR LAYER SHORT DETECTION OF ELECTRIC ROTATING MACHINE

(75) Inventors: Shingo Inamura, Hitachi (JP); Masami Sukeda, Takahagi (JP); Ryoichi Shiobara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 136 days.

(21) Appl. No.: 11/836,373

(22) Filed: Aug. 9, 2007

(65) Prior Publication Data
US 2008/0074111 A1 Mar. 27, 2008

(30) Foreign Application Priority Data
Sep. 27, 2006 (JP) .............. 2006-261654

(51) Int. Cl.
*G01R 31/34* (2006.01)
*G01R 31/06* (2006.01)
(52) U.S. Cl. .................... 324/772; 324/260
(58) Field of Classification Search ............... 324/260, 324/772
See application file for complete search history.

(56) References Cited

U.S. PATENT DOCUMENTS 4,377,784 A * 3/1983 Saito et al. ............... 324/772

FOREIGN PATENT DOCUMENTS

| JP | 40301877 | * | 1/1991 |
| JP | 5-076156 | | 3/1993 |
| JP | 020002874 | * | 10/2000 |
| JP | 0200403715 | * | 1/2004 |

* cited by examiner

*Primary Examiner*—Ha Tran T Nguyen
*Assistant Examiner*—Emily Y Chan
(74) *Attorney, Agent, or Firm*—Brundidge & Stanger, P.C.

(57) ABSTRACT

There is provided a detector for detecting a layer short of a field winding in operation by measuring, with a field detector, a magnetic field generated from a field winding of an electric rotating machine. In the present invention, a field detector is installed outside an electric rotating machine to measure a leakage flux at the installation point to detect layer short by detecting the increase in a leakage flux or asymmetry of waveform of the leakage flux at an occurrence of a layer short of a field winding thereof, simplifying installation and enabling installation without halting operations of an electric rotating machine.

7 Claims, 2 Drawing Sheets

METHOD AND APPARATUS FOR LAYER SHORT DETECTION OF ELECTRIC ROTATING MACHINE

BACKGROUND OF THE INVENTION (1) Field of the Invention

The present invention relates to a method and an apparatus for layer short detection of an electric rotating machine and in particular relates to a method and an apparatus for layer short detection of an electric rotating machine suitable for detecting a layer short of a field winding in operation by measuring a magnetic flux generated from a field winding.

(2) Description of Related Art

In general, in the case where a layer short takes place in an electric rotating machine. The number of turns of a field winding decreases at the point where the short has taken place and therefore the generated magnetic field decreases at layer short point. Moreover, the waveform of magnetic field becomes asymmetric. Thus, electromagnetic force may get unbalanced to thereby cause a great amount of vibration. Moreover, the field winding may be abnormally heated to burn out other components.

The above described phenomena will take place due to the centrifugal force due to high-speed rotation of a rotor of an electric rotating machine in operation or otherwise a force generated by heat expansion of a field winding due to temperature rise. Therefore, a layer short is more frequently detected in operations.

A detection apparatus for detecting a layer short of a field winding of electric rotating machine in operation described in JP-A-5-76156, for example, includes a detector for detecting a magnetic field generated by a field winding; cables for transmitting a signal of the magnetic field detector; a device for pulling out the cable to the outside of an electric rotating machine; and appliances for measuring signal of the magnetic field detector.

Normally, a magnetic field detector is installed on the surface of a stator iron core facing a rotor to measure a magnetic field in a gap between the rotor and the stator iron core to thereby detect a layer short.

BRIEF SUMMARY OF THE INVENTION

However, in the above described prior arts, a magnetic field detector is installed in the vicinity of the surface of rotation of a rotor inside an electric rotating machine. Therefore, a work space for installation and an installable space are narrow and it is not easy to install the magnetic field detector. In addition, since signal cables are pulled out from the magnetic field detector to the outside of an electric rotating machine, a device for preventing gas leakage is required in the case that the interior of the electric rotating machine is filled with high-pressure gas and seals high-pressure gas. Moreover, in the case that the interior of the machine is filled with high-pressure gas and seals high-pressure gas, installation of a magnetic field detector must be carried out taking measures against gas leakage. Moreover, this work occasionally gives rise to such a disadvantage that it is necessary to halt the operation of the electric rotating machine.

The present invention has been attained in view of the above described points. The object hereof is to provide a method and an apparatus for layer short detection of an electric rotating machine enabling to simply install a magnetic field detector for layer short detection of a field winding not only without halting operations, but also without requiring no device for preventing high-pressure gas leakage.

In order to attain the above described object, an apparatus for layer short detection of an electric rotating machine, which is the present invention, is comprising a magnetic field detector for measuring a leakage flux generated from a field winding of an electric rotating machine to detect a layer short of a field winding, wherein the field detector is installed outside electric rotating machine where the leakage flux flows; and the field detector installed outside the machine measures a leakage flux generated from a field winding in operation to detect a layer short of a field winding by measuring the increase in the leakage flux or asymmetry of waveform of leakage flux.

In addition, a method for layer short detection of an electric rotating machine, which is the present invention, is a method for layer short detection of an electric rotating machine for detecting a layer short of a field winding by measuring a leakage flux generated from a field winding of an electric rotating machine, wherein a field detector installed outside an electric rotating machine where a leakage flux from a field winding flows measures a leakage flux generated from a field winding in operation to detect a layer short of a field winding by measuring the increase in the leakage flux or asymmetry of waveform of leakage flux.

In the present invention, a field detector for detecting a layer short of a field winding is installed outside an electric rotating machine and therefore it is possible to provide a method and an apparatus for layer short detection of an electric rotating machine which not only can simplify installation of a field detector without halting operations of an electric rotating machine but also requires no device for preventing high-pressure gas leakage.

In the present invention, a field detector is installed outside an electric rotating machine and therefore a field winding layer short detector can be installed without halting operations of an electric rotating machine. In addition, installation thereof is simple so that workability in installation can be significantly improved.

Other objects, features and advantages of the invention will become apparent from the following description of the embodiments of the invention taken in conjunction with the accompanying drawings.

DETAILED DESCRIPTION OF THE INVENTION

The object that a field detector for detecting a layer short of a field winding can be installed easily without halting operations and moreover no device for preventing high-pressure gas leakage is required is realized by installing a magnetic field detector outside an electric rotating machine.

EXAMPLE 1

An embodiment of the present invention will be described with reference to the figures.

Figure 1:
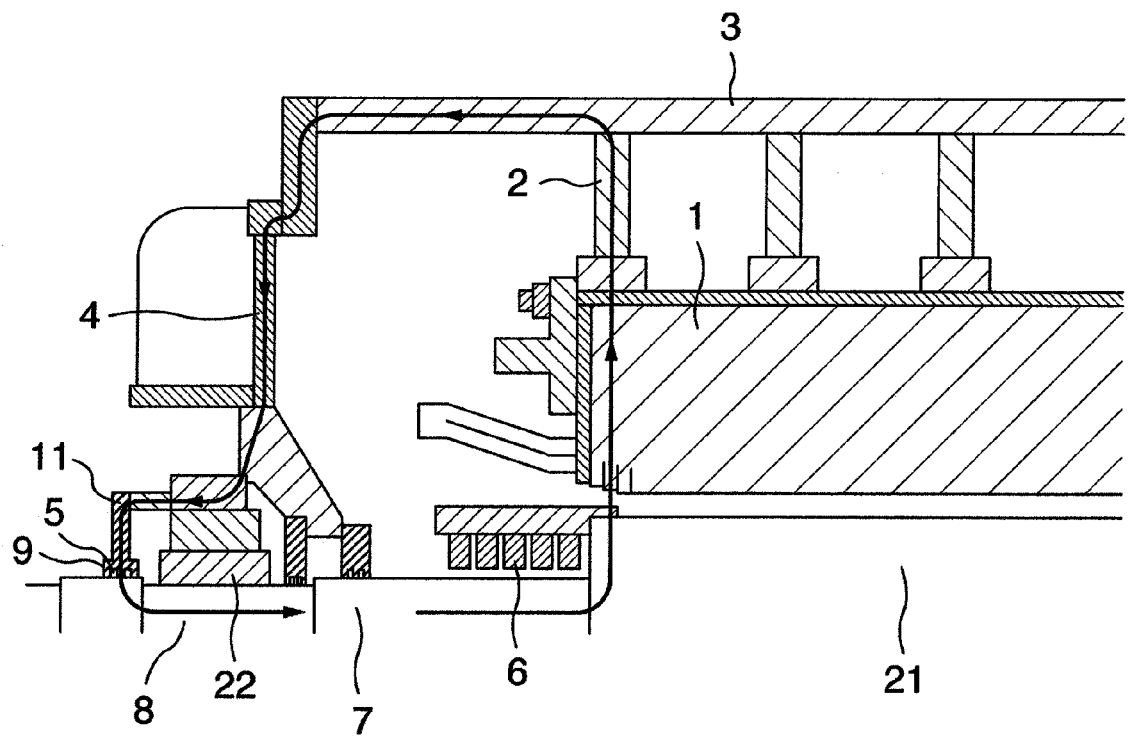
FIG. 1 is a cross-section partially illustrating an electric rotating machine in which an apparatus for layer short detection of the present invention is adopted (Example 1)

FIG. 1 is a cross-section partially illustrating an electric rotating machine in which an apparatus for layer short detection of the present invention is adopted.

In the above figure, a stator iron core 1 is arranged outside a rotor iron core 21 wound by field winding 6 and a rotor shaft 7 with a predetermined gap. A stator iron core 1 is supported by a cylindrical stator frame outer plate 3 with a stator frame rib 2. Both ends in the axial direction of the stator frame outer plate 3 are supported by end brackets 4. A bearing 22 rotatably supports the rotor shaft 7. On the both end sides in the axial direction of the bearing 22, a bearing oil deflector 5 housed in a bearing oil deflector housing brackets 11 is installed. The present example comprises a layer short detector 9 being a magnetic field detector installed outside the bearing oil deflector 5 installed outside the electric rotating machine.

Figure 2:
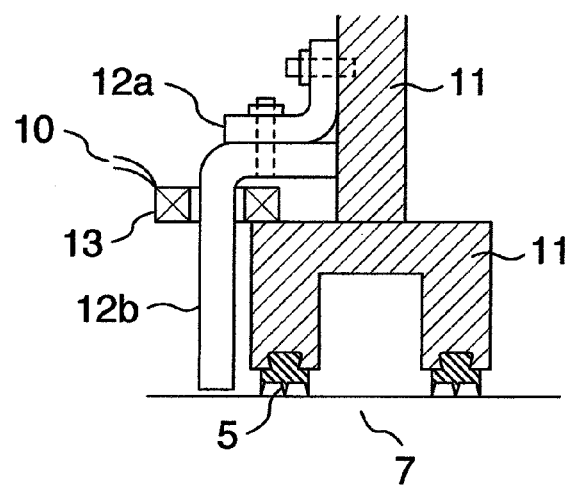
FIG. 2 is a cross-section in the vicinity of a bearing oil deflector illustrating how to install an apparatus for layer short detection in FIG. 1 (Example 1)

The detailed installation of the layer short detector 9 is illustrated in FIG. 2. As illustrated in the above drawing, the layer short detector 9 is formed of a field detection coil 13. The first installation device 12a is fixed in a bearing oil deflector housing bracket 11 with a bolt and the like, the second installation device 12b is fixed in the first installation device 12a with a bolt and the like and the field detection coil 13 is wound in the second installation device 12b. The first and the second installation devices 12a and 12b made with magnetic material contacts the bearing oil deflector housing bracket 11 is fixed so as to come adjacent to the rotor shaft 7. Here, the signal cable 10 is pulled out from the field detection coil 13 and is connected to a display apparatus (not illustrated in the drawing) through the signal cable.

In such a configuration, the field winding 6 of an electric rotating machine generates a magnetic flux, which mainly flows as a main magnetic flux in the stator iron core 1 inside an electric rotating machine in the circumferential direction of the iron core and also flows as a magnetic leakage flux 8 outside the electric rotating machine. The leakage flux 8 will go through the route of the stator iron core 1 of an electric rotating machine→the stator frame rib 2→the stator frame outer plate 3→an end bracket 4→the bearing oil deflector 5→the rotor shaft 7→the stator iron core 1 in FIG. 1.

An occurrence of a layer short in the field winding 6 decreases the number of turns of the field winding 6 at the short point. Therefore, the magnetic field at the short point gets decreased and a magnetic flux waveform gets asymmetric at the short point. That asymmetry in flux waveform generates a magnetic flux in the rotation axis direction of the rotor shaft 7. That will increase the leakage flux 8 and the leakage flux waveform gets asymmetric.

The present example measures the leakage flux 8 outside the above described electric rotating machine with the field detection coil 13 to detect an increase in the leakage flux 8 or asymmetry of the waveform. The leakage flux and thereby to detect a layer short in the field winding 6.

Specifically, the first and the second installation devices 12a and 12b constitute a branch circuit for the leakage flux flowing in the bearing oil deflector 5 to detect the leakage flux with the field detection coil 13. The field detection coil 13 is installed outside an electric rotating machine and enlarges the work space for installation and the installable space to simplify such as installation and adjustment of position.

In addition, even in the case where the interior of the electric rotating machine is filled with high-pressure gas and seals high-pressure gas. The signal cable 10 pulled out from the layer short detector 9 does not require any devices for preventing high-pressure gas leakage present inside an electric rotating machine because a layer short detector 9 is installed outside the electric rotating machine. Consequently that will simplify the structure of the detection apparatus.

Moreover, due to the above described reason, it is possible to install the layer short detector 9 without halting operations of the electric rotating machine.

EXAMPLE 2

Figure 3:
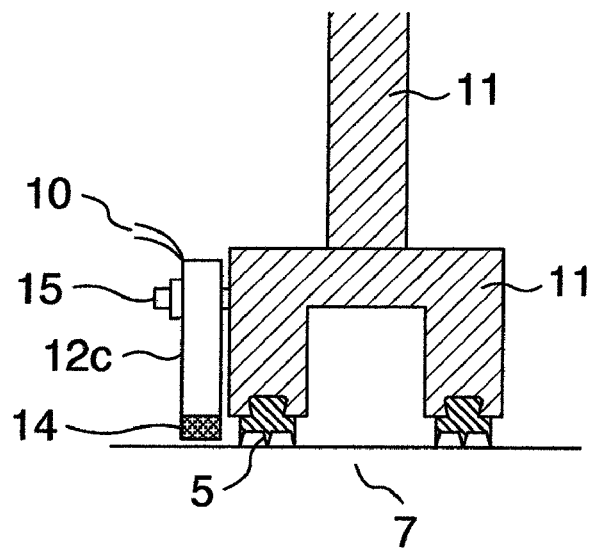
FIG. 3 is a diagram corresponding to FIG. 2, illustrating a second example of the present invention (Example 2)

In the above described example, the field detection coil 13 is used as the layer short detector 9 but other detectors such as a hall element and the like can also be used. Such an example is illustrated in FIG. 3.

In an example illustrated in the above figure, a field detector 14 being a layer short detector 9 attached in an installation device 12c is fixed with a simple fixing device such as an installation pin 15, and installed on a bearing oil deflector housing bracket 11 in the vicinity of the bearing oil deflector 5 outside an electric rotating machine.

Even in such a configuration, the field detector 14 is installed outside an electric rotating machine and therefore, likewise the Example 1, works such as installation and adjustment of position will be simplified. In addition, the field detector 14 is installed outside an electric rotating machine and the signal cable 10 pulled out from field detector does not require any devices for preventing high-pressure gas leakage present inside an electric rotating machine and, which will be simplified in structure as a detection apparatus. In addition, it is possible to install the field detector 14 without halting operations of an electric rotating machine.

EXAMPLE 3

Figure 4:
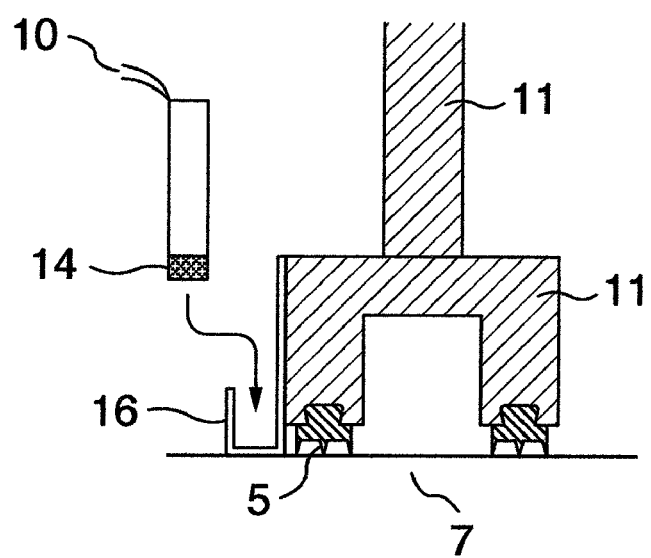
FIG. 4 is a diagram corresponding to FIG. 2, illustrating a third example of the present invention (Example 3).

In the above described example 2, field detector 14 is attached in the installation device 12c installed on the bearing oil deflector housing bracket 11. However, as in FIG. 4, a housing holder 16 of the nonmagnetic material installed on the bearing oil deflector housing bracket 11 and the like can be adopted the installation device 12c attaching the field detector 14 can be housed in the housing holder 16. Installation of the housing holder 16 is adjusted in position so that the leakage flux of the bearing oil deflector 5 is measurable with the field detector 14.

Even in such a configuration, the field detector 14 is installed outside an electric rotating machine and does not have to be fixed. Therefore that will simplify not only installation but also removal as well. And, the field detector 14 can be installed and removed without halting operations of an electric rotating machine and, therefore, can be used as a portable detector.

Here, in the above described example, the field detection coil 13 or the field detector 14 are installed in the vicinity of the bearing oil deflector 5, but can be installed at the point such as the bearing oil deflector housing bracket 11. That is, the installable space of the field detection coil 13 or the field detector 14 will not be limited to the vicinity of the bearing oil deflector 5 but can be any point where a leakage flux is measurable to simplify works such as installation and adjustment of position.

It should be further understood by those skilled in the art that although the foregoing description has been made on embodiments of the invention, the invention is not limited thereto and various changes and modifications may be made without departing from the spirit of the invention and the scope of the appended claims.

The invention claimed is;

1. An electric rotating machine, for detecting a layer short of a field winding by measuring a leakage flux generated from the field winding, wherein the electric rotating machine includes a rotor shaft, a bearing rotatably supporting the rotor shaft, a rotor iron core mounted on the rotor shaft and wound by the field winding to generate a magnetic flux including the leakage flux, and a stator iron core facing to the rotor iron core with a gap therebetween to generate a magnetic force between the rotor iron core and the stator iron core, and wherein the electric rotating machine further includes a magnetically permeable member having a first part facing closely to the rotor shaft and a second part contacting the stator iron core to enable the leakage flux to pass through the magnetically permeable member, wherein the field winding generates the magnetic flux, including the leakage flux, flowing inside and outside the electric rotating machine, wherein the leakage flux flows from the field winding inside the electric rotating machine to the magnetically permeable member outside the electric rotating machine, and wherein a field detector installed outside the electric rotating machine where the leakage flux from the field winding flows, detects the leakage flux passing through the magnetically permeable member, and measures outside the electric rotating machine the leakage flux of the field winding in operation to detect a layer short of the field winding by detecting the increase in the leakage flux or asymmetry of waveform of the leakage flux resulting from the layer short and passing through the magnetically permeable member.

2. An apparatus for layer short detection of an electric rotating machine comprising a magnetic field detector for measuring a leakage flux generated from a field winding of the electric rotating machine to detect a layer short of the field winding, the electric rotating machine including a rotor shaft, a bearing rotatably supporting the rotor shaft, a rotor iron core mounted on the rotor shaft and wound by the field winding to generate a magnetic flux including the leakage flux, and a stator iron core facing to the rotor iron core with a gap therebetween to generate a magnetic force between the rotor iron core and the stator iron core, and wherein the electric rotating machine further includes a magnetically permeable member having a first part facing closely to the rotor shaft and a second part contacting the stator iron core to enable the leakage flux to pass through the magnetically permeable member, wherein the field winding generates the magnetic flux, including the leakage flux, flowing inside and outside the electric rotating machine, wherein the leakage flux flows from the field winding inside the electric rotating machine to the stator core to the magnetically permeable member outside the electric rotating machine, and wherein the field detector is installed outside the electric rotating machine where the leakage flux from the field winding flows, detects the leakage flux passing through the magnetically permeable member, and measures outside the electric rotating machine the leakage flux generated from the field winding in operation to detect a layer short of the field winding by detecting the increase in the leakage flux or asymmetry of waveform of the leakage flux resulting from the layer short and passing through the magnetically permeable member.

3. The apparatus for layer short detection of an electric rotating machine according to claim 2, wherein the field detector comprises a field detection coil wound around an installation device fixed on a bearing oil deflector housing bracket for the electric rotating machine to a detect the leakage flux flowing to the bearing oil deflector housing bracket with the field detection coil, the installation device constituting a branch circuit for the leakage flux flowing to the bearing oil deflector housing bracket, and wherein the field detector detects the leakage flux passing through the installation device and measures outside the electric rotating machine the leakage flux generated from the field winding in operation to detect the layer short of the field winding by detecting the increase in the leakage flux or asymmetry of waveform of the leakage flux resulting from the layer short and passing through the installation device.

4. The apparatus for layer short detection of an electric rotating machine according to claim 2, wherein the field detector is installed outside a bearing oil deflector or a bearing oil deflector housing bracket for the electric rotating machine with a fixing device.

5. The apparatus for layer short detection of an electric rotating machine according to claim 2, wherein the field detector is detachably housed in a field detector housing holder installed outside a bearing oil deflector or a bearing oil deflector housing bracket for the electric rotating machine.

6. The apparatus according to claim 2, wherein the rotor shaft is rotatably supported by the bearing at an axial position between the first part and the field winding.

7. The apparatus according to claim 2, wherein the magnetic field detector is arranged in the vicinity of the first part.

* * * * *